US010391933B2

(12) United States Patent
Schmidt et al.

(10) Patent No.: US 10,391,933 B2
(45) Date of Patent: Aug. 27, 2019

(54) ILLUMINATION APPARATUS, VEHICLE COMPONENT AND VEHICLE

(71) Applicant: SMR Patents S.à.r.l., Luxembourg (LU)

(72) Inventors: Oliver Schmidt, Stuttgart (DE); Daniel Fritz, Stuttgart (DE); Jacob Messenger, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/181,917

(22) Filed: Nov. 6, 2018

(65) Prior Publication Data
US 2019/0071006 A1    Mar. 7, 2019

Related U.S. Application Data

(63) Continuation-in-part of application No. 15/262,396, filed on Sep. 12, 2016.

(30) Foreign Application Priority Data

Sep. 15, 2015  (DE) .................... 20 2015 104 894 U

(51) Int. Cl.
| | |
|---|---|
| *B60Q 1/26* | (2006.01) |
| *B60Q 1/56* | (2006.01) |
| *F21V 7/00* | (2006.01) |
| *F21V 7/05* | (2006.01) |
| *B60R 13/00* | (2006.01) |
| *G09F 19/18* | (2006.01) |
| *G09F 21/04* | (2006.01) |

(52) U.S. Cl.
CPC ............. *B60Q 1/56* (2013.01); *B60Q 1/2615* (2013.01); *B60Q 1/2665* (2013.01); *B60R 13/005* (2013.01); *F21V 7/0033* (2013.01); *F21V 7/05* (2013.01); *G09F 19/18* (2013.01); *G09F 21/04* (2013.01)

(58) Field of Classification Search
CPC ...... B60Q 1/56; B60Q 1/2615; B60Q 1/2665; B60R 13/005; F21V 7/0033; F21V 7/05; G09F 19/18; G09F 21/04
See application file for complete search history.

(56) References Cited

U.S. PATENT DOCUMENTS

| | | | | |
|---|---|---|---|---|
| 2005/0117364 A1* | 6/2005 | Rennick | ................ | B60R 1/1207 362/540 |
| 2010/0238417 A1* | 9/2010 | Streppel | ............... | G03B 21/006 353/84 |
| 2013/0130674 A1* | 5/2013 | De Wind | ............. | B60Q 1/2619 455/420 |

* cited by examiner

*Primary Examiner* — Mary Ellen Bowman
(74) *Attorney, Agent, or Firm* — Jones Day

(57) ABSTRACT

An illumination device includes at least one illuminant for emitting light, and an optical reflection unit, including at least one reflective surface, and at least one surface including at least one mask, where the optical reflection unit is configured to receive the light emitted from the at least one illuminant and project at least one of an image, a symbol, a logo, and a legend on a projection surface.

28 Claims, 4 Drawing Sheets

ILLUMINATION APPARATUS, VEHICLE COMPONENT AND VEHICLE

CROSS-REFERENCE TO RELATED APPLICATIONS

This application is a continuation-in-part of U.S. patent application Ser. No. 15/262,396, filed on Sep. 12, 2016, which claims the benefit of priority to German Patent Application No. 202015104894.7, filed on Sep. 15, 2015, each of which is hereby incorporated by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The following description relates to an illumination apparatus, a vehicle component and a motor vehicle.

2. Related Art

Illumination apparatuses for motor vehicles are known from the state of the art. Typically, an illumination apparatus includes a number of parts and components including, but not limited to, a condenser lens, a projector lens, a mask, among other components. Multiple illumination apparatus components are typically combined into one housing to form the device. The components may be aligned with one another so that they share a single axis, and light from a light source may follow a path along the single axis so that an image from a mask is projected.

DE 20 2008 016 695 U1, for example, describes an illumination apparatus having a so-called logo lamp in which an image or legend is projected onto a projection surface through the interaction of an illuminant, a condenser unit, a mask means and a lens unit. The illumination apparatus is arranged in a rearview device realized as an external mirror in order to project an image or a legend onto a roadway or sidewalk. The individual components of the illumination apparatus are arranged behind one another in a tubular housing. Because of the essentially vertical course of the optical path, the known illumination apparatus in the external mirror is arranged essentially perpendicular to the projection surface. The illumination apparatus can be integrated directly into an external mirror, or be attached into a corresponding receptacle on the external mirror. Indeed, the rigid arrangement of the individual components of the illumination apparatus in the tubular housing makes it difficult to integrate the illumination apparatus into or onto the external mirror because of the limited space.

DE 101 34 594 A1 describes an illumination apparatus which is adapted to project an object correlated with the driving situation into a surrounding area of a vehicle.

DE 10 2004 050 600 A1 describes an illumination apparatus for a vehicle for generating a light field in the region of the vehicle door.

US 2009/0161379 A1 describes the projection of a pattern onto a subsurface using an illumination apparatus in an external mirror.

US 2014/0362596 A1, WO 2015/122482 A1 and DE 10 2006 057 671 A1 describe other illumination apparatuses for vehicles and/or components for illumination apparatuses.

SUMMARY

In one aspect, an illumination device includes at least one illuminant for emitting light, and an optical reflection unit, including at least one reflective surface, and a surface including at least one mask, where the optical reflection unit is configured to receive the light emitted from the at least one illuminant and project at least one of an image, a symbol, a logo, a pattern, and a legend on a projection surface.

The at least one reflective surface may include at least two reflective surfaces, each of the two reflective surfaces on opposite sides of the optical reflection unit.

The at least one reflective surface may include at least three reflective surfaces, two of the three reflective surfaces being on a same side of the optical reflection unit and one of the three reflective surfaces being on an opposite side of the optical reflection unit.

The at least one reflective surface and the surface including the at least one mask may be on opposite sides of the optical reflection unit.

The at least one reflective surface and the surface including the at least one mask may be on a same side of the optical reflection unit.

The optical reflection unit may include at least four sides and the light emitted from the at least one illuminant may be configured to be projected on at least two of the at least four sides of the optical reflection unit before being projected to the projection surface.

The at least one reflective surface may include metalized or internally reflective freeform optics.

The at least one reflective surface may be at least partly planar or curved.

The surface including the at least one mask may include at least one of an image ablated metalized reflective surface and a micro-optic.

The at least one surface may include the at least one mask and be formed together with one of the at least one reflective surface.

The optical reflection unit may include at least two curved edges and at least on planar edge.

The optical reflective unit may have a freeform geometry.

The light emitted from the at least one illuminant may be configured to enter the optical reflection unit from a first side of the optical reflection unit, the light projected to the projection surface may be configured to exist the optical reflection unit from a second side of the optical reflection unit, the at least one reflective surface may include at least two reflective surfaces with one of the two reflective surfaces being formed on the first side and the other being formed on the second side, and the surface including the at least one mask may be formed on the first side.

The at least one surface including the at least one mask may be formed together with the reflective surface on the first side.

The light emitted from the at least one illuminant may be configured to contact an inner surface of the optical reflection unit at least four times before being projected to the projection surface.

The at least one reflective surface may be configured to deflect the optical path in at least one of a range of 35° to 145°, 45° to 135°, 60° to 120°, and about 90°.

The at least one mask may be at least one of mechanically and electrically alterable or adjustable in order to change at least one of an image, a symbol, a logo and a legend that the mask is configured to display on the projection surface.

The at least one reflective surface may include a lens arranged on the at least one reflective surface and configured as a separate or separable component in order to focus the light.

The at least one reflective surface may include at least one of a condenser unit and a lens unit.

The illuminant may emit the light essentially perpendicular to the projection surface.

At least one of the at least one reflective surface or the at least one surface including the at least one mask may be incorporated into the optical reflection unit or separate components arranged close to or attached to the optical reflection unit.

In another aspect, a vehicle unit of a motor vehicle may include at least one illumination device.

The at least one illumination device may provide a logo lamp, which is adapted to be at least one of moveable relative to the vehicle or attachable to the exterior of the vehicle The vehicle unit may include at least one of an internal or external mirror or camera.

In yet another aspect, a motor vehicle may include at least one vehicle unit.

DESCRIPTION OF THE SEVERAL VIEWS OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Figure 1:
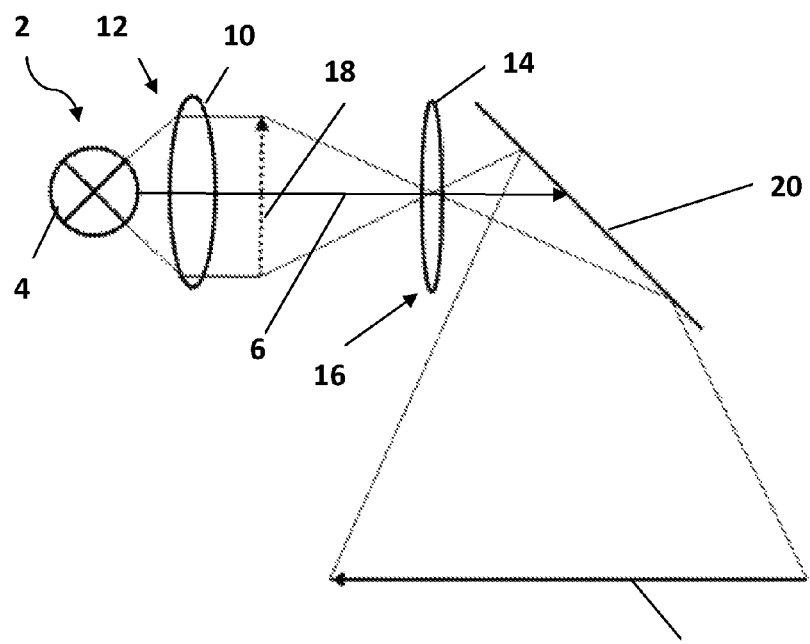
FIG. 1 is a diagram illustrating a first example of an illumination apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The figures each depict an illumination apparatus 2 for a vehicle component of a motor vehicle as in the form of an external mirror or camera, for example. The depicted illumination apparatuses 2 each include an illuminant 4 by means of which light can be emitted, essentially parallel to a plane of a projection surface 8 for example.

In addition, each illumination apparatus 2 includes at least one condenser lens 10 of a condenser unit 12. The condenser lens 10 couples the light emitted by the illuminant 4 into an optical path 6, which can also run essentially parallel to the plane of the projection surface 8, depending on the embodiment example.

As depicted in the figures, the illumination apparatus 2 also includes at least one objective lens 14 of a lens unit 16.

In order to display a logo 8, for example, onto the projection surface, the illumination apparatus 2 furthermore includes a mask means 18.

The illumination apparatuses 2 illustrated in the figures furthermore each include a reflector unit 20, which makes it possible for the optical path 6 to be deflected essentially transversely or diagonally to the projection surface 8.

FIG. 1 depicts a first example of the illumination apparatus 2. In this example, the condenser unit 12, which also includes the condenser lens 10, is provided directly following the illuminant 2. Subsequently, the light passes through the mask means 18 before it impinges on the objective lens 14, which is included in the lens unit 16. In the further course of the optical path 6, the light then impinges on the reflector unit 20, which deflects it by essentially 90° degrees onto the projection surface 8.

Figure 2:
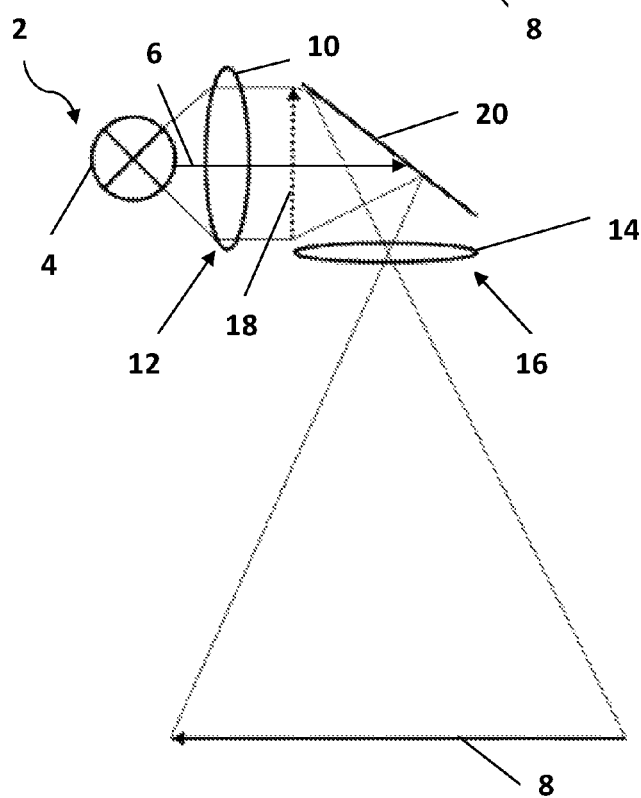
FIG. 2 is a diagram illustrating a second example of an illumination apparatus.

FIG. 2 depicts a second example of the illumination apparatus 2. In this example, as also shown in FIG. 1, first the illuminant 4, the condenser unit 12 and the mask means 18 are arranged one behind the other so that the light also passes through these components successively. Then the light does not pass through the lens unit 16 however, but is first deflected on the reflector unit 20. After being deflected by the reflector unit 20, the light passes through the lens unit 16 to then arrive at the projection surface 8. This construction allows a reduction in the space needed for installation.

Figure 3:
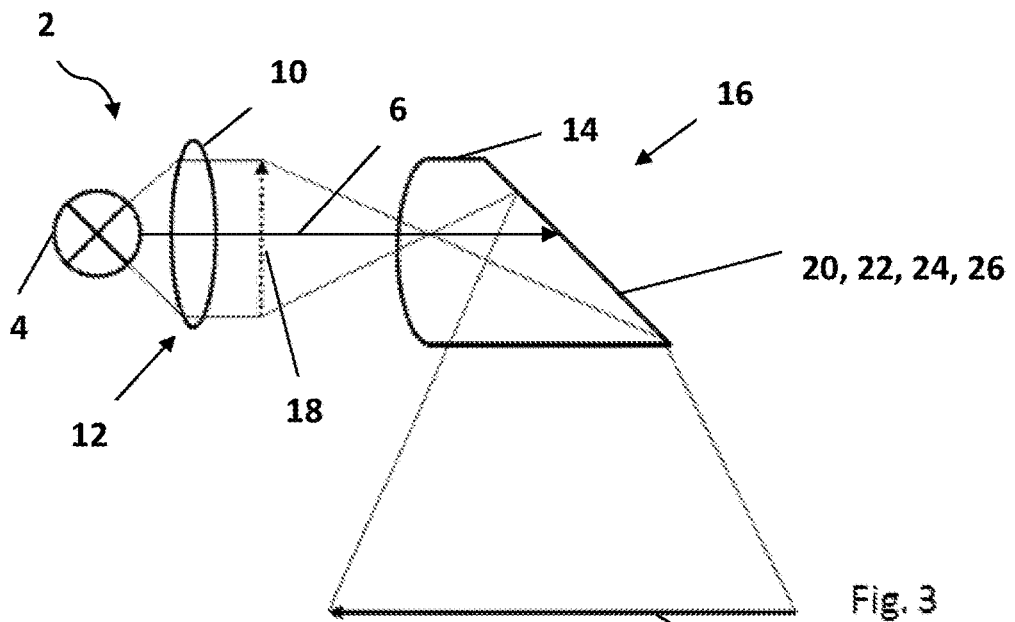
FIG. 3 is a diagram illustrating a third example of an illumination apparatus.

FIG. 3 depicts a third example of the illumination apparatus 2. In this example, the illumination apparatus is implemented with reduced components. The light emitted by the illuminant 4 first passes through the condenser unit 12 and the mask means 18, then, as already shown in FIG. 2, it directly impinges on the reflector unit 20. In the example depicted in FIG. 3, a reflector element 22, which includes a light guide 24 and/or a prism 26, forms the reflector unit 20. The reflector element 22 thereby assumes the function of the lens unit 16. The example of the illumination apparatus 2 depicted in FIG. 3 can thus be produced with reduced components and implemented compactly.

Figure 4:
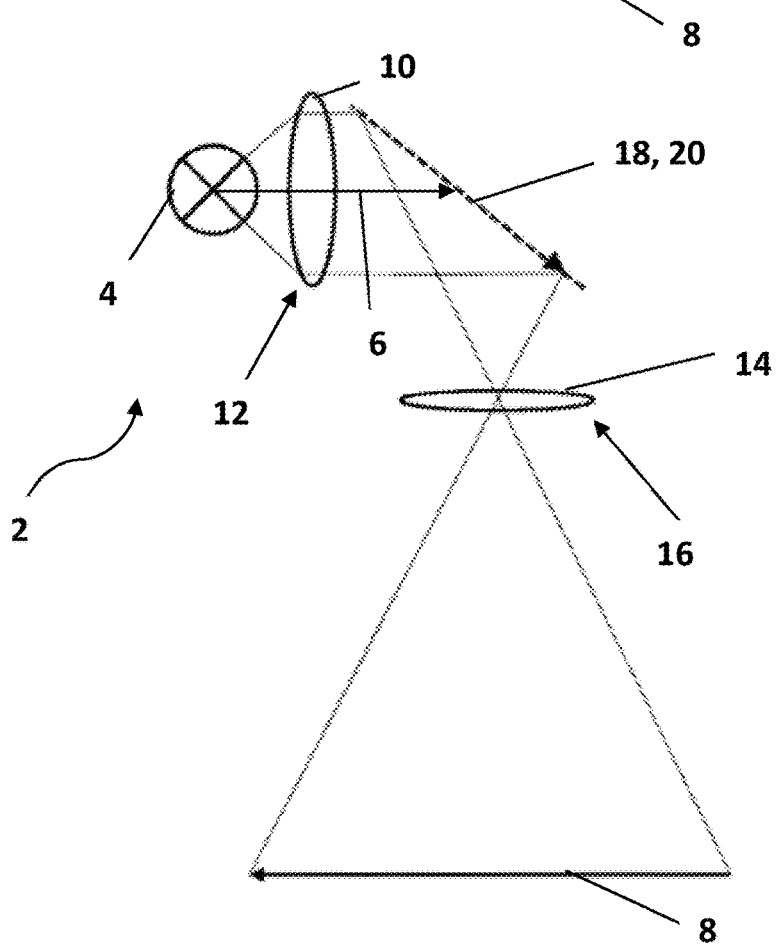
FIG. 4 is a diagram illustrating of a fourth example of an illumination apparatus.

FIG. 4 depicts a fourth example of the illumination apparatus 2. The depicted illumination apparatus 2 essentially corresponds to the illumination apparatus 2 depicted in FIG. 2. In contrast to the illumination apparatus 2 depicted in FIG. 2, here no mask means 18 configured as a separate component is provided between the condenser unit 12 and reflector unit 20. Rather, the mask means 18 and the reflector unit 20 are combined in a common component. The installation dimensions of the illumination apparatus 2 can thereby also be reduced.

Figure 5:
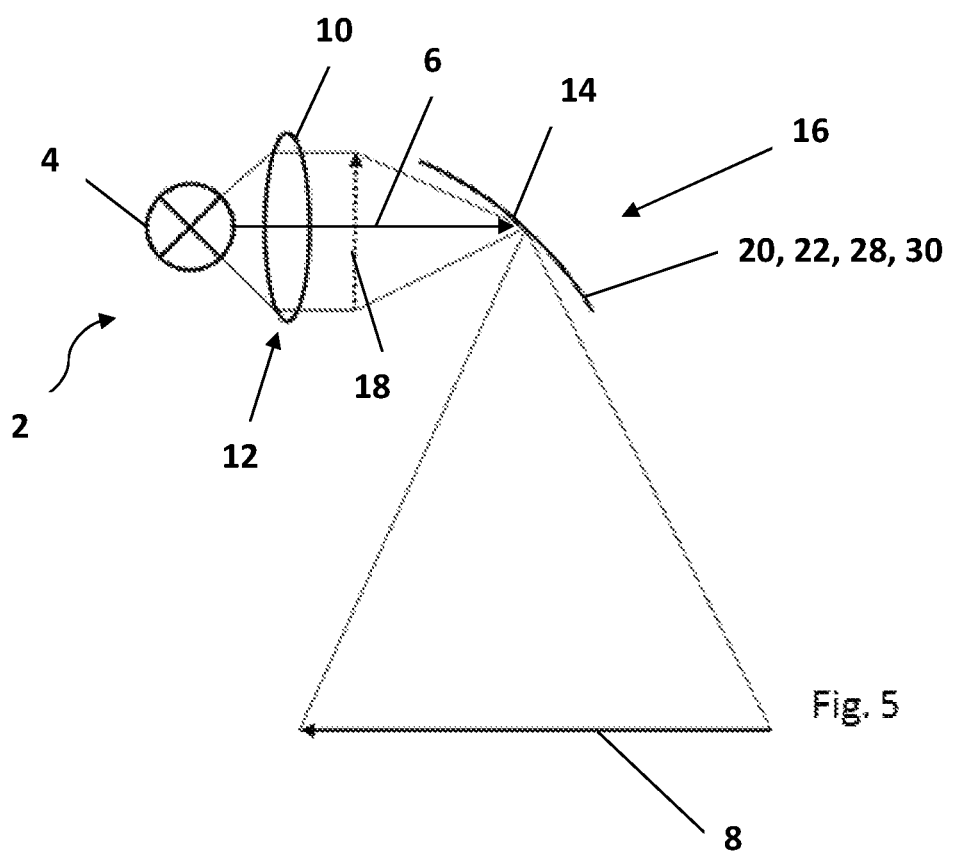
FIG. 5 is a diagram illustrating a fifth example of an illumination apparatus.

FIG. 5 depicts a fifth example of the illumination apparatus 2. In the depicted example, the lens unit 16 and the reflector unit 20 are included within a common component. In contrast to the example depicted in FIG. 3, the reflector unit 20 does not include a light guide and/or prism as reflector element 22, but is realized by a freeform surface 28, which is configured on a surface section 30 of the reflector element 22.

Figure 6:
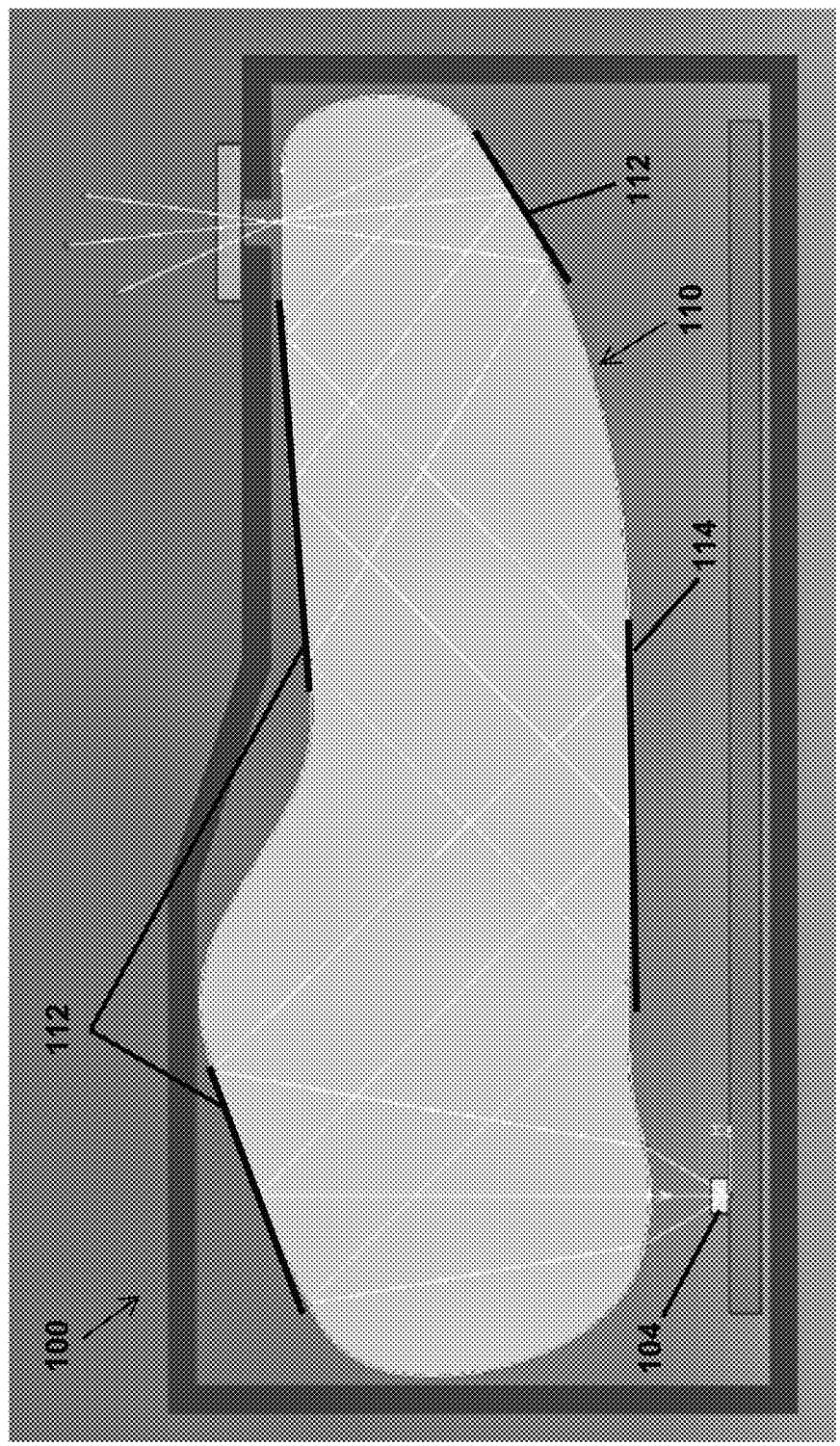
FIG. 6 is a diagram illustrating a sixth example of an illumination apparatus.

FIG. 6 depicts another example of an illumination apparatus 100. The illumination apparatus 100 includes a light source 104. Unlike the illumination apparatus 2 of other examples, the illumination apparatus 100 of this example includes a single optical component 110 instead of multiple components. The single reflective optical component 110 of this example includes a plurality of mirrors and reflective surfaces 112. In a preferred example, the single reflective optical component 110 is freeform in shape with the optical axis being segmented between the plurality of mirrors 112. The plurality of mirrors 112 may include metalized or internally reflective freeform optics and/or surfaces. As a result, the single optical component 110 may replace the lenses in a logo projector system such as the condenser lens 10, the objective lens 14, and the reflector unit 20 described in other examples, i.e. as illustrated in FIGS. 1-5, with a single component. This results in significant assembly advantages over the state of the art as well as cost advantages due to lower piece count.

Still referring to FIG. 6, the single optical component 110 of the illumination apparatus 100 preferably also contains a planar surface with a selectively reflective surface 114 either incorporated into the single optical component 110 or as a separate component arranged close to or attached to the single optical component 110. The surface 114 may be a surface which is an image ablated metalized reflective surface, or may be a micro-optic as used in Digital Light Processing (DLP) applications. In other examples, the surface 114 may be selectively transmissive rather than being reflective, and may be freeform rather than being planar. The surface 114 produces a mask that is then projected by the lamp onto the ground or to the selected projecting surface. As may be appreciated, the mask surface 114 replaces the mask means 18 described in other example thereby further reducing the number of components.

In a preferred example, the surfaces of the reflective surfaces 112 are all internally reflective. In other words, the incident light is below the critical angle of the material which makes a high index material preferable. This is because an internally reflective surface has very high efficiency, i.e. greater than 99%, whereas a coated surface like a mirror is significantly less efficient. In addition, the reflective surfaces 112 preferably do not overlap one another. As a result, the angle of reflection may range from greater than 10 degrees (change in optical path) to less than 170 degrees. In another example, the optical component 110 may be changed to have a more prismatic arrangement where all reflections are over 90 degrees and the shape of the optical component 110 is similar to a staircase.

In the examples described above, the one or more reflective surfaces 112 which are configured to receive incident light from the light source 104 prior to the mask surface 114 are for configured to capture the light from the light source 104 and focus it onto the mask surface 114. The one or more reflective surfaces 112 which are configured to receive incident light after the light is received by the mask surface 114 are configured to project (focus) the mask onto the projection plane. In the preferred example, as many of the reflective surfaces 112 as possible are formed from a material which exhibits total internal reflection rather than refraction, and instead of being plated/painted to form a reflective surface, as described above.

In an aspect, an illumination apparatus for a vehicle component, especially for a rearview device of a motor vehicle, may include at least one illuminant, wherein the illuminant is adapted to emit light. The illumination apparatus furthermore features a condenser unit including at least one condenser lens, wherein the condenser unit is adapted to focus the light emitted by the at least one illuminant into an optical path. The term "optical path" in this connection refers to the geometrical course of light beams and can also be called beam direction. The term "focus" refers to coupling light into an optical path, wherein as large a portion of the emitted light of the illuminant as possible is to be brought into the image-forming optical path. Moreover, the illumination apparatus features at least one mask means, which is arranged in the optical path and by means of which an image, symbol, logo and/or legend can be displayed on a projection surface. Moreover, the illumination apparatus features a lens unit having at least one objective lens, which is arranged in the optical path. According to the invention, the illumination apparatus also features at least one reflector unit which is arranged between the condenser unit and the projection surface, wherein the reflector unit is adapted to deflect the optical path, especially essentially transversely or diagonally, to the projection surface, wherein the reflector unit includes a reflector element which includes at least one surface section by means of which the light can be deflected relative to the optical path, and wherein the surface section of the reflector element is configured as a freeform surface in order to focus the light. In this connection, the expression "deflect transversely or diagonally to the projection surface" relates to a deflection or diversion of the optical path at an angle to the vertical to the projection surface. "Deflection of the optical path" can also be understood as a deflection of an optical axis. In this connection, the term "optical axis" describes the averaged propagation direction of all beams in the image-forming optical path between successive units The use of the reflector unit allows the illumination apparatus to be arranged in or on the vehicle component in a place-saving manner. The illumination apparatus according to the invention does not need to be arranged exclusively vertical to a projection surface, but can also be arranged diagonally to the projection surface for example or parallel to the projection surface. This facilitates the integration of the illumination apparatus to the extent that a particular place does not absolutely have to be provided for the illumination apparatus, but the illumination apparatus can rather be provided in the vehicle component at a location and with an orientation that just happens to offer adequate space for its installation.

In one example, the reflector unit is adapted to deflect the optical path in a range of 35° to 145°, preferably of 45° to 135°, more preferably of 60° to 120°, especially by 90°.

In another example of the invention, the at least one reflector unit is arranged along the optical path of the light, proceeding from the illuminant up to the projection surface, in front of or behind the lens unit. In addition, the at least one reflector unit can however also be arranged any place inside the illumination apparatus. It is basically conceivable that the illumination apparatus includes a plurality of reflector units. This proves advantageous particularly when the installation space available inside the vehicle component is not straight, but angular.

It is furthermore conceivable that the illuminant is surrounded by another reflector means in such a manner that light which is not coupled into the optical path is collected by the reflector means and coupled into the optical path. This allows the intensity of the light in the optical path and the utilization of the light emitted by the illuminant to be improved.

In still another example, the mask means is arranged along the optical path of the light, proceeding from the illuminant up to the projection surface, between the condenser unit and the lens unit.

In one example, the reflector unit includes the mask means. The illumination apparatus can be realized compactly and with reduced components if the reflector unit includes the mask means. In this case, the mask means and reflector unit can be included within a common component for example, or be joined in such a manner that they are undetectably or detachably connected together and can be added in as a pre-assembled subassembly of the reflector unit.

In another example, the mask means is mechanically and/or electrically alterable or adjustable in order to change the image, symbol, logo and/or the legend that the mask means can display on the projection surface. It is also basically conceivable to prescribe that the mask means cannot change the image, symbol, logo and/or the legend that the mask means can display on the projection surface.

In addition, the mask means can display a plurality of images or a continuous legend, for example.

The reflector unit can basically be configured as desired. In one example, the reflector unit includes a lens means arranged on the reflector element and configured as a separate or separable component in order to focus the light. In this example, the lens means can include the condenser unit and/or the lens unit.

If the surface section of the reflector element is configured as a freeform surface, then the reflector unit can be implemented compactly.

If a plurality of reflector units is provided, then it is conceivable for example that a first reflector unit includes the condenser unit and a second reflector unit includes the lens unit. This allows the number of individual components in the illumination apparatus to be further reduced.

In another example, the reflector unit includes both the mask means and also the condenser unit and/or the lens unit. This advantageously allows the number of components of the illumination apparatus to be further reduced. The configuration of the reflector unit both as mask means and also as condenser unit and/or as lens unit is then especially advantageous when little space is available in the vehicle component to arrange the illumination apparatus therein or thereon.

In one example, the reflector unit includes both the mask means and also the condenser unit and/or the lens unit. In still another example, the reflector element includes a light guide and/or a prism.

In a further example, the at least one condenser lens of the condenser unit and/or the at least one objective lens of the lens unit includes at least one tonic lens element. This thereby advantageously allows rectangular displays with high irradiance, even in corners, to be realized in a simple manner.

If the illumination apparatus according to the invention is arranged parallel to a plane of a projection surface, then the illuminant can also emit the light essentially parallel to the projection surface. A diagonal emission relative to the projection surface is also conceivable.

The at least one condenser lens of the condenser unit and/or the at least one objective lens of the lens unit can be developed fundamentally or as desired.

In addition, the invention provides a vehicle component of a motor vehicle having at least one illumination apparatus according to the invention. The vehicle component can be any component on the vehicle that is arranged so that it can enable access to the external surroundings of the motor vehicle. To this end, it can for example concern a body panel for example, a bumper device, elements of the vehicle doors and the like. Preferably this vehicle component can include a rearview device, like interior or exterior mirror or camera.

In one example, the optical path of the light directly emitted by the illuminant runs essentially parallel to a driving surface. Since the optical path runs essentially parallel to the driving surface, the illumination apparatus is essentially arranged horizontally. In addition, it is nevertheless conceivable that the illumination apparatus is arranged running diagonally or vertically to the driving surface.

In another example, at least one hollow space, which forms a housing for the illumination apparatus and within which the illumination apparatus can be fixed, is configured in the vehicle component. It is basically conceivable that the illumination apparatus is fixed on the vehicle component for example. To nevertheless be able to protect the illumination apparatus from damage and soiling, it proves advantageous if the illumination device can be fixed within the vehicle component. In addition to protection from soiling and damage, an arrangement of the illumination apparatus that is optically appropriate is thereby furthermore selected.

What is claimed is:

1. An illumination device, comprising:
   at least one illuminant for emitting light; and
   an optical reflection unit, comprising:
      at least one reflective surface; and
      at least one surface comprising at least one mask,
      wherein the optical reflection unit is configured to receive the light emitted from the at least one illuminant and project at least one of an image, a symbol, a logo, a pattern, and a legend on a projection surface, and
      wherein the at least one reflective surface comprises at least two reflective surfaces, each or the at least two reflective surfaces on opposite sides of the optical reflection unit.

2. The illumination device of claim 1, wherein the at least one reflective surface comprises at least three reflective surfaces, two of the at least three reflective surfaces being on a same side of the optical reflection unit and one of the at least three reflective surfaces being on an opposite side of the optical reflection unit.

3. The illumination device of claim 1, wherein the at least one reflective surface and the at least one surface comprising the at least one mask are on opposite sides of the optical reflection unit.

4. The illumination device of claim 1, wherein the at least one reflective surface and the at least one surface comprising the at least one mask are on a same side of the optical reflection unit.

5. The illumination device of claim 1, wherein the optical reflection unit comprises at least four sides and the light emitted from the at least one illuminant is configured to be projected on at least two of the at least four sides of the optical reflection unit before being projected to the projection surface.

6. The illumination device of claim 1, wherein the at least one reflective surface comprises metalized or internally reflective freeform optics.

7. The illumination device of claim 6, wherein the at least one reflective surface is at least partly planar or curved.

8. The illumination device of claim 1, wherein the at least one surface comprising the at least one mask comprises at least one of an image ablated metalized reflective surface and a micro-optic.

9. The illumination device of claim 8, wherein the at least one surface comprising the at least one mask is formed together with one of the at least one reflective surface.

10. The illumination device of claim 1, wherein the optical reflection unit comprises at least two curved edges and at least on planar edge.

11. The illumination device of claim 10, wherein the optical reflective unit has a freeform geometry.

12. The illumination device of claim 1, wherein the light emitted from the at least one illuminant is configured to enter the optical reflection unit from a first side of the optical reflection unit, the light projected to the projection surface is configured to exist the optical reflection unit from a second side of the optical reflection unit, the at least one reflective surface comprises at least two reflective surfaces with one of the two reflective surfaces being formed on the first side and the other being formed on the second side, and the at least one surface comprising the at least one mask is formed on the first side.

13. The illumination device of claim 12, wherein the at least one surface comprising the at least one mask is formed together with the reflective surface on the first side.

14. The illumination device of claim 1, wherein the light emitted from the at least one illuminant is configured to contact an inner surface of the optical reflection unit at least four times before being projected to the projection surface.

15. The illumination device of claim 1, wherein the at least one reflective surface is configured to deflect the optical path in at least one of a range of 35° to 145°, 45° to 135°, 60° to 120°, and about 90°.

16. The illumination device of claim 1, wherein the at least one mask is at least one of mechanically and electrically alterable or adjustable in order to change at least one of the image, the symbol, the logo and the legend that the mask is configured to display on the projection surface.

17. The illumination device of claim 1, wherein the at least one reflective surface comprises a lens arranged on the at least one reflective surface and configured as a separate or separable component in order to focus the light.

18. The illumination device of claim 1, wherein the at least one reflective surface comprises at least one of a condenser unit and a lens unit.

19. The illumination device of claim 1, wherein the illuminant emits the light at an angle of between approximately 0 degrees and approximately 20 degrees with respect to a normal axis of the projection surface.

20. The illumination device of claim 1, wherein at least one of the at least one reflective surface or the at least one surface comprising at least one mask are incorporated into the optical reflection unit or are separate components arranged close to or attached to the optical reflection unit.

21. A vehicle unit of a motor vehicle, comprising at least one illumination device according to claim 1.

22. The vehicle unit of claim 21, wherein the at least one illumination device provides a logo lamp, which is adapted to be at least one of moveable relative to the vehicle or attachable to the exterior of the vehicle.

23. The vehicle unit of claim 21, wherein the vehicle unit comprises at least one of an internal or external mirror or camera.

24. A motor vehicle, comprising at least one vehicle unit according to claim 21.

25. An illumination device, comprising:
   at least one illuminant for emitting light; and
   an optical reflection unit, comprising:
      at least one reflective surface; and
      at least one surface comprising at least one mask,
      wherein the optical reflection unit is configured to receive the light emitted from the at least one illuminant and project at least one of an image, a symbol, a logo, a pattern, and a legend on a projection surface, and
      wherein the at least one reflective surface comprises at least three reflective surfaces, two of the at least three reflective surfaces being on a same side of the optical reflection unit and one of the at least three reflective surfaces being on an opposite side of the optical reflection unit.

26. An illumination device, comprising:
   at least one illuminant for emitting light; and
   an optical reflection unit, comprising:
      at least one reflective surface; and
      at least one surface comprising at least one mask,
      wherein the optical reflection unit is configured to receive the light emitted from the at least one illuminant and project at least one of an image, a symbol, a logo, a pattern, and a legend on a projection surface, and wherein the optical reflection unit comprises at least four sides and the light emitted from the at least one illuminant is configured to be projected on at least two of the at least four sides of the optical reflection unit before being projected to the projection surface.

27. An illumination device, comprising:
at least one illuminant for emitting light; and
an optical reflection unit, comprising:
  at least one reflective surface; and
  at least one surface comprising at least one mask,
wherein the optical reflection unit is configured to receive the light emitted from the at least one illuminant and project at least one of an image, a symbol, a logo, a pattern, and a legend on a projection surface, and
wherein the light emitted from the at least one illuminant is configured to enter the optical reflection unit from a first side of the optical reflection unit, the light projected to the projection surface is configured to exist the optical reflection unit from a second side of the optical reflection unit, the at least one reflective surface comprises at least two reflective surfaces with one of the two reflective surfaces being formed on the first side and the other being formed on the second side, and the at least one surface comprising the at least one mask is formed on the first side.

28. An illumination device, comprising:
at least one illuminant for emitting light; and
an optical reflection unit, comprising:
  at least one reflective surface; and
  at least one surface comprising at least one mask,
wherein the optical reflection unit is configured to receive the light emitted from the at least one illuminant and project at least one of an image, a symbol, a logo, a pattern, and a legend on a projection surface, and
wherein the light emitted from the at least one illuminant is configured to contact an inner surface of the optical reflection unit at least four times before being projected to the projection surface.

* * * * *